Figure 1:
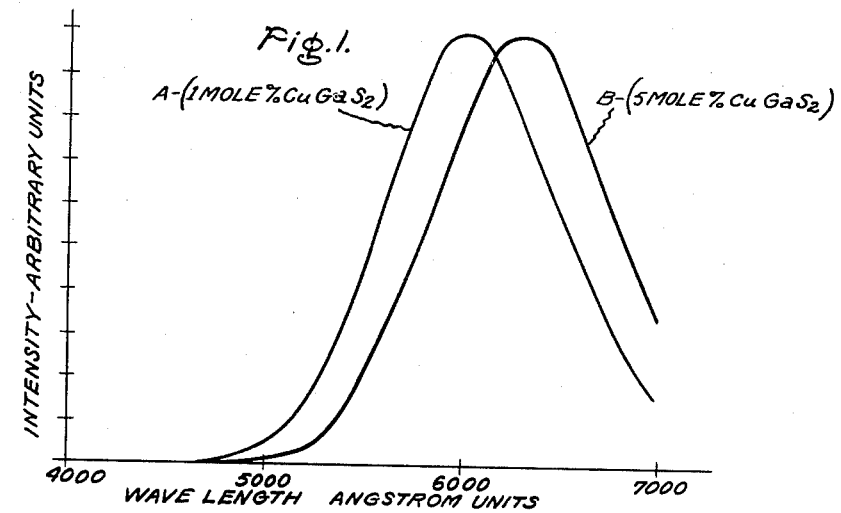

A-(1 MOLE % Cu Ga S₂)
B-(5 MOLE % Cu Ga S₂)

Inventor:
Eugene F. Apple,
by Paul A. Frank
His Attorney.

2,947,705
LUMINESCENT ZINC SULFIDE PHOSPHORS AND THE PREPARATION THEREOF

Eugene F. Apple, Schenectady, N.Y., assignor to General Electric Company, a corporation of New York Filed Apr. 10, 1957, Ser. No. 651,906

8 Claims. (Cl. 252—301.6)

The present invention relates to improved methods for preparing zinc sulfide phosphors and to phosphors produced thereby.

It is well known that luminescent materials may be produced by adding minor quantities of metallic activator materials such as copper, to zinc sulfide. In addition to a metallic activator, a co-activator such as a monovalent anion, for example chlorine, or a trivalent cation, for example gallium, are also generally added. These activators and co-activators, enter the zinc sulfide crystal lattice and replace zinc atoms, forming "centers of activation" which are responsible for luminescent emission. The activator and co-activator should be present within the crystal lattice in approximately equal concentrations for maximum efficiency.

When an activator, such as copper, and a coactivator, such as gallium, are added to zinc sulfide in elemental form or in the form of water soluble salts, it is extremely difficult to cause high concentrations thereof to enter the zinc sulfide crystal lattice substitutionally. Additionally, it is extremely difficult to control the activator and co-activator concentrations so that both are present in approximately the same concentration. Furthermore, zinc sulfide phosphors prepared by conventional methods often suffer deleterious effects because of oxygen inclusions due to the use of water slurries or oxygen containing salts.

Accordingly, one object of the invention is to provide a method for preparing copper and gallium activated zinc sulfide phosphors containing extremely high concentrations of activator and co-activator atoms.

A further object of the invention is to provide a method for preparing copper and gallium activated zinc sulfide phosphors having closely controlled and equal concentrations of activator and co-activator atoms therein.

Another object of the invention is to provide a method for preparing oxygen-free zinc sulfide phosphors.

Still another object of the invention is to provide improved copper and gallium activated zinc sulfide phosphors and an improved method for the preparation thereof.

Briefly stated, in accord with the invention, improved copper and gallium activated zinc sulfide phosphors are prepared by firing weighted mixtures of copper-gallium sulfide ($CuGaS_2$) and zinc sulfide in a reducing atmosphere. Because of the great similarity of the crystalline structure of these two sulfides, they are mutually soluble in each other in all proportions. By virtue of this characteristic, greater concentrations of copper and gallium may be substitutionally incorporated within the resultant phosphors than have been heretofore obtainable. Because of these greater concentrations, phosphors produced by thus method containing high activator concentrations exhibit an orange-red emission not heretofore obtainable from copper and gallium activated zinc sulfide phophors.

Figure 2:
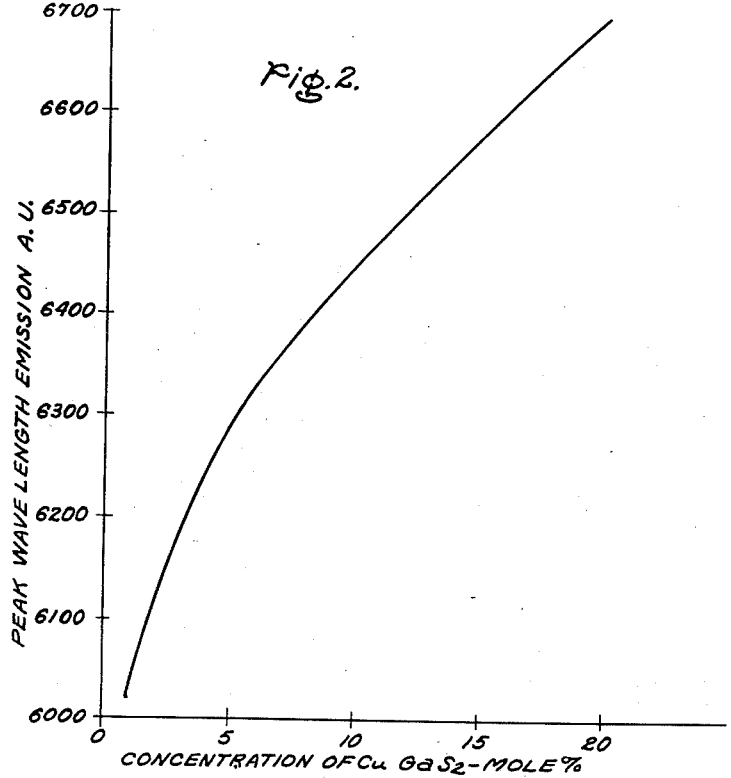

The novel features believed characteristic of the invention are set forth in the appended claims. The invention itself, together with further objects and advantages thereof, may best be understood by reference to the following description taken in connection with the attached drawing in which:

Figure 1 is a graphical representation of the emission of two typical phophors prepared in accord with the invention, and Figure 2 is a graphical representation of the peak emission of orange-red emitting phosphors prepared in accord with the invention, as a function of the percentage of copper-gallium sulfide present.

Luminescent zinc sulfide phosphors are generally known to exist in two crystalline structures. The first of these structures is the cubic or zinc-blende (sphalerite) crystalline structure and the second is the hexagonal (wurtzite) structure. The present invention is concerned only with cubic zinc sulfide or zinc blende luminescent phosphors. Cubic zinc sulfide possesses a diamond-type crystal lattice structure. This structure comprises two interpenetrating face centered cubic lattices. In this structure, alternate atoms of the crystal lattice are zinc atoms and the remainder are sulfur. Thus, each zinc atom is tetrahedrally surrounded by four sulfur atoms and each sulfur atom is tetrahedrally surrounded by four zinc atoms. In copper and gallium activated cubic zinc sulfide phosphors, a copper atom substitutes for a zinc atom and a gallium atom substitutes for a neighboring zinc atom within the lattice. The adjacent copper and gallium atoms maintain electrical balance within the lattice, but may undergo an enrgy change when subjected to radiant energy or cathode rays and, at a later time, undergo a second energy change with the consequent emission of visible light.

Heretofore, copper and gallium have been added to zinc sulfide to form copper and gallium activated zinc sulfide phosphors by adding elemental copper or gallium, or water soluble salts in a water slurry, to the zinc sulfide prior to firing. Upon firing, a small amount of the copper and gallium presnt enters the lattice substitutionally. It has been impossible, heretofore, to cause large concentrations of copper and gallium to enter into the crystal lattice by these methods. Although the exact reason for this is not understood, the maximum concentrations of copper that have been reported as substitutionally present in zinc sulfide phosphors is approximately 1% by weight and the maximum reported concentration of gallium as an activator in zinc sulfide is of the order of 0.01% by weight. Therefore, while my invention may be practiced utilizing as little as 0.01 mole percent of copper-gallium sulfide, it is particularly useful utilizing from 1 to 20 mole percent copper-gallium sulfide, since these percentages result in the formation of a new system of phosphors.

The compound copper-gallium sulfide ($CuGaS_2$) is structurally similar to zinc blende and possesses the same tetrahedral configuration of atoms. In copper-gallium sulfide, the sulfur atoms have the same position as in zinc sulfide, but the zinc atoms are replaced by alternate copper and gallium atoms. I have found that when copper-gallium sulfide and zinc sulfide are fired together after intimate mixture, as by ball-milling, these two compounds form a complete series of solid solutions indicating complete solubility of the two compounds in each other in all proportions.

By virtue of this characteristic, I have been able to form copper and gallium activated zinc sulfide phosphors having a higher concentration of copper and gallium therein than has been heretofore obtainable by prior art methods for producing zinc sulfide phosphors. This higher concentration of gallium and copper within the zinc sulfide lattice results, among other things, in a different emission spectrum than has heretofore been observed with copper and gallium activated zinc sulfide phosphors. In general, the phosphors of the invention are produced by firing from 0.01 to 20 mole percent of copper-gallium sulfide with zinc sulfide in a reducing atmosphere. Phosphors produced by this method utilizing from 0.01 to 0.5 mole percent of copper-gallium sulfide exhibit green luminescence. Phosphors produced by this method utilizing from 1.0 to 20 mole percent of copper-gallium sulfide exhibit orange or red luminescence. The method of the invention is of particular utility in this latter range since orange and red luminescent phosphors activated with copper and gallium have not been produced heretofore.

Copper-gallium sulfide, used in the preparation of phosphors of the present invention, may be prepared by mixing stoichiometric quantities of copper sulfide (CuS) and gallium sulfide ($Ga_2S_3$) by grinding and ball milling. The mixture of these sulfides is fired in a reducing atmosphere which may for example be hydrogen sulfide or hydrogen at approximately 800° for several hours. The resulting product (copper-gallium sulfide) is orange in color, as compared with the gray color exhibited by a mixture of copper sulfide and gallium sulfide prior to firing. X-ray diffraction studies of the copper-gallium sulfide, prepared as described above, show that the salt possesses a tetragonal crystal structure which is distinguishable from cubic zinc sulfide primarily by the fact that one lattice constant (Co) is approximately double that of cubic zinc sulfide, indicating a longer basic unit cell.

In preparing gallium and copper activated zinc sulfide phosphors in accord with the present invention, approximately 0.01 to 20 mole percent of copper gallium sulfide is mixed with luminescent grade cubic zinc sulfide and, after mixing by ball milling, the mixed sulfides are fired in a reducing atmosphere, for example hydrogen sulfide or hydrogen at a temperature of 800° C. to 1000° C. and preferably from 900° C. to 975° C. for approximately one-half to two hours. Although luminescent copper and gallium activated zinc sulfide phosphors may be prepared by firing quantities of sulfide containing less than 1.0 mole percent of copper gallium sulfide, the present invention is of greatest utility when practiced utilizing 1.0 to 20 mole percent of copper-gallium sulfide, since in this range the process results in the preparation of luminescent phosphors containing concentrations of copper and gallium not heretofore obtainable. Accordingly, the preferred concentration of copper and gallium sulfide utilized in accord with the present invention is from 1.0 to 20 mole percent. The resultant phosphors then contain from 1 to 20 grams atomic percent each of copper and gallium. While solid solutions of copper-gallium sulfide and zinc sulfide may be obtained by firing mixtures containing greater than 20 mole percent of copper-gallium sulfide, the resultant materials are not very efficient luminescent phosphors.

The temperature at which the mixed sulfides are fired must be no higher than 1000° C., since at temperatures above 1020° C. the cubic zinc blend structure is transformed into the the hexagonal or wurtzite form of zinc sulfide and the mutual solubility of the copper gallium-sulfide and the zinc sulfide may be lost. Phosphors prepared by firing mixtures of copper-gallium sulfide and zinc sulfide at temperatures in excess of 1000° C. have resulted in inferior products which show spotty, low brightness luminescence. Firing must be conducted at a temperature in excess of 800° C. or the mixed sulfides do not properly form solid solutions. The optimum result insofar as brightness and uniformity of the resultant phosphor are concerned, are obtained when the sulfides are fired at from 900° C. to 975° C. for approximately one-half to two hours. At least one-half hour is required. Although the firing may be conducted for greater lengths of time than two hours, no great advantage is secured thereby. Phosphors prepared in accord with the invention exhibit a maximum brightness when the starting mixture contains approximately 5 mole percent of $CuGaS_2$, resulting in approximately 5 gram atomic percent each of copper and gallium in the phosphor.

In Figure 1 of the drawing, there is illustrated typical emission curves of two copper-gallium activated zinc sulfide phosphors prepared in accord with the present invention. As may be seen from these curves, the emission of the phosphors, which in this case are prepared by firing 1 and 5 mole percent, respectively, of copper-gallium sulfide with zinc sulfide in an atmosphere of hydrogen sulfide, have a rather sharply peaked emission, peaked in the orange-red portion of the visible spectrum. This is in contrast to previously reported copper and gallium activated zinc sulfide phosphors which exhibit emission peaks at approximately 4500 A.U., 5160 A.U. and 5700 A.U. in the blue and green portions of the visible spectrum. The total emission of previously reported copper and gallium activated zinc sulfide phosphors is therefore blue-green. The total emission of the phosphors, the characteristics of which are represented by Figure 1 of the drawing, however, peak at approximately 6000 A.U. (Curve A) and 6300 A.U. (Curve B) respectively and exhibit clear, bright, orange-red luminescence.

In Figure 2 of the drawing, there is shown a graphical representation of the peak emission of high copper and gallium containing phosphors prepared in accord with the present invention as a function of the percentage of copper-gallium sulfide fired with the zinc sulfide. As may be seen from Figure 2, the total emission of these phosphors varies from approximately 6000 A.U. at 1.0 mole percent of copper-gallium sulfide to approximately 6700 A.U. at approximately 20 mole percent copper-gallium sulfide.

Phosphors prepared in accord with the present invention possess a number of advantages. In the first instance, since the phosphor is prepared by firing two salts together in a reducing atmosphere in the absence of water or oxygen-containing compounds, no oxides are formed within the phosphor and hence any deleterious effects which may be produced by the presence of oxides in zinc sulfide phosphors are completely absent. Additionally, as is mentioned hereinbefore, since the preparation of the phosphors in accord with the invention involves mutual solubility of two salts having the similar crystal lattice structures, which salts are mutually soluble in each other in all proportions, greater concentrations of copper and gallium within the zinc sulfide are attained than have been heretofore obtainable. Because of the high concentrations of gallium and copper within the phosphors utilizing 1.0 to 20 mole percent of $CuGaS_2$, the wavelength of the emission of these phosphors is higher than any wavelength heretofore attainable from copper and gallium activated zinc sulfide phosphors.

Additionally, since the emission spectra of these phosphors possesses only a single peak which is relatively sharp, the phosphors possess a relatively pure emission, highly desirable in cathode ray applications, particularly in color television.

A further advantage of the preparation of copper and gallium activated zinc sulfide phosphors in accord with the present invention is the relative certainty that copper and gallium are present within the resultant phosphor in equal proportions. This is possible because copper and gallium are present in stoichiometric quantities within the copper-gallium sulfide one mole of which contains 1 gram atom of each. Thus, an equal number of atoms of copper and gallium are present within the resultant phosphors.

These advantages of the phosphors prepared in accord with the present invention, are believed attributable to the firing of the copper-gallium sulfide together with the zinc sulfide. These advantages may not be obtained if copper and gallium activated zinc sulfide phosphors are formed by firing of other materials with zinc sulfide. Thus, for example, if copper and gallium are added as oxides, nitrates, or sulfates it is cerain that these results would not be obtainable, since these gallium salts are not readily converted to gallium sulfide to form copper-gallium sulfide. Therefore, high concentrations of copper and gallium cannot be obtained by such methods.

The following examples of the practice of the present invention are given by way of example only and are not to be construed in a limiting sense.

*Example 1.*—Ten grams of gallium oxide ($Ga_2O_3$) was thermally decomposed by heating in a hydrogen sulfide atmosphere at 800° for two hours. The resultant product was gallium sulfide ($Ga_2S_3$). 4.647 grams of $Ga_2S_3$ was mixed with 3.750 grams of CuS, ground, and ball milled for two hours. After ball milling, the mixture of the two sulfides was heated in a hydrogen sulfide atmosphere at 800° for 1¾ hours. After heating, the resulting solid was light orange in color and did not luminesce at room temperature. X-ray crystallographic analysis showed the material to have a tetragonal crystal structure indicating the formation of copper gallium sulfide ($CuGa_2S_3$). 3.08 grams of luminescent grade cubic zinc sulfide was mixed with 1.560 grams of copper gallium sulfide and ball milled for four hours. After ball milling, the mixed sulfides were fired in a hydrogen sulfide atmosphere for 45 minutes at 1000° C. The fired mixture was suspended on a conducting glass slide and placed on the faceplate of a demountable cathode ray tube. Under cathode ray excitation the phosphor luminesced red. Red luminescence was also obtained when the phosphor was irradiated by 3650 A.U. ultraviolet light.

*Example 2.*—Copper gallium sulfide was prepared as in Example 1. 8.86 grams of luminescent grade cubic zinc sulfide was mixed with 1.972 grams of copper gallium sulfide and ball milled for four hours. After ball milling, the mixture was fired at 1000° C. for 45 minutes. The resultant phosphor had a yellow body color and, when subjected to 3650 A.U. ultraviolet excitation, exhibited red luminescence. Red luminescence was also observed when the phosphor was excited by cathode rays as in Example 1.

*Example 3.*—Copper-gallium sulfide was prepared as in Example 1. 9.35 grams of luminescent grade cubic zinc sulfide was mixed with .987 gram of copper-gallium sulfide and ball milled for four hours. After ball milling, the sulfide mixture was fired in hydrogen sulfide for 45 minutes at 1000° C. After firing, the phosphor had a yellow body color, and under X-ray crystallographic analysis, showed the characteristic structure of cubic zinc sulfide. When irradiated by 3650 A.U. ultraviolet radiation, the phosphor exhibited orange-red luminescence. Orange-red luminescence was also observed when the phosphor was excited by cathode rays as in Example 1.

*Example 4.*—0.64 gram of luminescent grade cubic zinc sulfide was mixed with 0.198 gram of copper-gallium sulfide as prepared in Example 1. The sulfide mixture was then ball milled for four hours and fired in hydrogen sulfide for 45 minutes at 1000° C. After firing, the phosphor had a yellow body color, and under X-ray crystallographic analysis exhibited the zinc blende crystal structure. Under a 3650 A.U. ultraviolet excitation, the phosphor exhibited orange-yellow luminescence. Orange-yellow luminescence was also observed when the phosphor was subjected to cathode ray excitation as in Example 1.

*Example 5.*—19.46 grams of luminescent grade cubic zinc sulfide was mixed with 0.004 gram of copper-gallium sulfide prepared as in Example 1. The mixture was ball milled for four hours and fired in hydrogen sulfide for 45 minutes at 1000° C. After firing the phosphors exhibited a yellow body color and, under X-ray crystallographic analysis, showed the zinc blende crystal structure. Under 3650 A.U. ultraviolet excitation, phosphor exhibited green luminescence. Green luminescence was also observed when the phosphor was excited by cathode rays as in Example 1.

Luminescent phosphors prepared in accord with the present invention may be incorporated into cathode ray tubes to form luminescent screens therefor. They are also useful in color television picture tubes. These phosphors are luminescent under cathode ray excitation and under ultraviolet excitation.

While the invention has been described hereinbefore with respect to specific examples, and certain embodiments thereof, many changes and modifications will immediately become apparent to those skilled in the art. Accordingly, by the appended claims I intend to cover all such modifications and changes as fall within the true spirit and scope of the foregoing disclosure.

What I claim as new and desire to secure by Letters Patent of the United States is:

1. The method of preparing a luminescent phosphor which method comprises preparing a mixture containing 0.01 to 20 mole percent of copper-gallium sulfide, the remainder being cubic zinc sulfide, and firing said mixture in a reducing atmosphere at a temperature of 800° C. to 1000° C.

2. The method of preparing a luminescent phosphor which method comprises preparing a mixture containing 0.01 to 20 mole percent copper-gallium sulfide, the remainder being cubic zinc sulfide, and firing said mixture in an atmosphere of hydrogen sulfide at a temperature of 800° C. to 1000° C.

3. The method of preparing a luminescent phosphor which method comprises preparing a mixture containing 0.01 to 20 mole percent of copper-gallium sulfide, the remainder being cubic zinc sulfide, and firing said mixture in an atmosphere of hydrogen sulfide at a temperature of 900° C. to 975° C.

4. The method of preparing an orange-red emitting luminescent phosphor which method comprises preparing a mixture containing 1 to 20 mole percent of copper-gallium sulfide, the remainder being cubic zinc sulfide and firing said mixture in a reducing atmosphere at a temperature of 800° C. to 1000° C.

5. The method of preparing an orange-red emitting luminescent phosphor which method comprises preparing a mixture containing 1 to 20 mole percent copper-gallium sulfide, the remainder being cubic zinc sulfide and firing said mixture in a hydrogen sulfide atmosphere at a temperature of 800° C. to 1000° C.

6. The method of preparing an orange-red emitting luminescent phosphor which method comprises preparing a mixture containing 1 to 20 mole percent of copper-gallium sulfide, the remainder being cubic zinc sulfide and firing the mixture in a reducing atmosphere at a temperature of 900° C to 975° C.

7. An orange-red emitting luminescent phosphor consisting essentially of cubic zinc sulfide activated with 1.0 to 20 gram-atomic percent of copper and gallium, said copper and gallium being present in equal proportions.

8. An orange-red emitting luminescent phosphor consisting essentially of cubic zinc sulfide activated with aproximately 5 gram-atomic percent of copper and gallium, said copper and gallium being present in equal proportions.

References Cited in the file of this patent

UNITED STATES PATENTS

| | | |
|---|---|---|
| 2,623,859 | Kroger | Dec. 30, 1952 |
| 2,743,237 | Froelich | Apr. 24, 1956 |
| 2,743,239 | Froelich | Apr. 24, 1956 |
| 2,743,240 | Froelich | Apr. 24, 1956 |

FOREIGN PATENTS

| | | |
|---|---|---|
| 167,792 | Australia | June 6, 1956 |

OTHER REFERENCES

Jour. of Elec. Chem. Soc., vol. 100 (1953), pages 280–288, 496–507.